Dec. 19, 1967 — D. G. THOMAS — 3,358,750
CONDENSER TUBE

Filed Aug. 10, 1966 — 4 Sheets-Sheet 1

INVENTOR.
David G. Thomas
BY
ATTORNEY.

United States Patent Office 3,358,750
Patented Dec. 19, 1967

3,358,750
CONDENSER TUBE
David G. Thomas, Oak Ridge, Tenn., assignor to the United States of America as represented by the United States Atomic Energy Commission
Filed Aug. 10, 1966, Ser. No. 571,655
6 Claims. (Cl. 165—177)

ABSTRACT OF THE DISCLOSURE

Small radial projections of rectangular or circular cross sections are fixed to the condensing surface of a condenser tube in a line parallel to the axis of the tube. The radial projections draw condensate from the tube surface between projections and thereby provide a substantial increase in the film condensation heat transfer coefficient of the tube.

---

The invention described herein was made in the course of, or under, a contract with the U.S. Atomic Energy Commission. It relates to heat transfer members in general, and more particularly to tubular heat transfer members having large film condensation heat transfer coefficients.

A significant obstacle to the production of low cost demineralized water through the use of distillation techniques has been that of the low efficiency of operation generally characterizing the condensation step of the distillation process. In order to improve the efficiency of the condensation step, double fluted tubes have been used to increase the film condensation heat transfer coefficient by causing condensate to drain into grooves formed longitudinally in the tube condensing surface. The condensate film drains from the crests between the grooves due to the effect of surface tension forces. The reduced film thickness along the crests caused by this draining action into the grooves greatly enhances the heat transfer through the crest areas. The condensate in the grooves is then channeled off by gravity.

Double fluted tubes are relatively expensive to fabricate, however, and the increased cost of fabrication partially offsets the gain in the film condensation heat transfer coefficient which they provide. In addition, a fluted inner wall as found in double fluted tubes is undesirable where it is desired to insert twisted tapes or detached turbulence promoters inside the tube increase convective heat transfer from the inner wall.

Fluted tubes also tend to have greater thicknesses in the metal tube wall where the high heat transfer crests are located. Such additional thickness is undesirable in that it provides increased resistance to heat transfer through the tube wall.

It is, accordingly, a general object of the present invention to provide an inexpensive, readily fabricable, tubular heat transfer member of simplified design having a large film condensation heat transfer coefficient.

Another object of the invention is to provide a tubular heat transfer member having a large film condensation heat transfer coefficient wherein the highest heat transfer coefficient occurs where the tube wall is thinnest.

Other objects of the invention will become apparent from an examination of the following description of the invention and the appended drawings, wherein.

In accordance with the present invention, an improved condenser tube is provided which is characterized by a large film condensation heat transfer coefficient. Small radial projections of rectangular and circular cross section are fixed to the condensing surface of a condenser tube along a line parallel to the axis of the tube. The radial projections draw condensate from the tube surface between projections and thus decrease the thickness of the condensate film on that surface. The decreased condensate film thickness between projections provides a substantial increase in the film condensation heat transfer coefficient of the tube.

Applicant has discovered that radial projections loosely attached to a vertical condenser tube along a line parallel to the tube axis provide a marked increase in the film condensation heat transfer coefficient.

The radial projections have been found to change the condensate flow from substantially two dimensional to three dimensional flow having a large component of velocity normal to the projections so that the condensate flows circumferentially as well as axially along the tube condensing surface.

Figure 2:
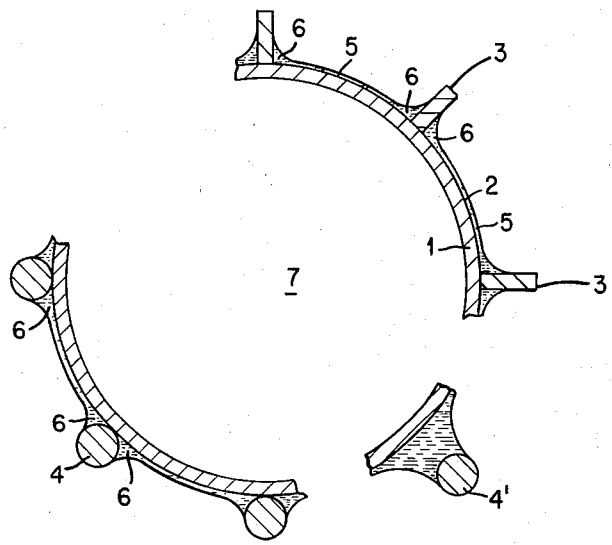
FIG. 2 is a transverse sectional view of the condenser tube of FIG. 1.
Figure 1:
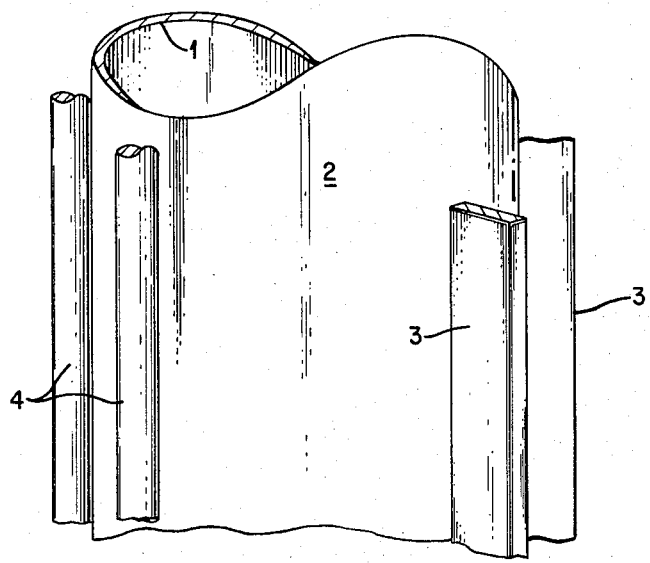
FIG. 1 is a longitudinal plan view of a condenser tube illustrating preferred and alternative embodiments of the present invention.

In order to facilitate an understanding of the invention, reference is made to the drawings, initially to FIGS. 1 and 2 where preferred and alternative forms of radial projections are shown in conjunction with a single condenser tube 1 having a condensing surface 2 and an internal coolant passage 7. Both figures are drawn in an enlarged scale in order to more clearly illustrate the manner in which the condensate film formed on the condenser tube behaves in the presence of the radial projections.

Projections 3, having a rectangular cross section in FIG. 2, represent the preferred embodiment; and projections 4, having a circular cross section, represent an alternative embodiment. Projections 3 will be referred to hereafter as fins 3, and projections 4 will be referred to as wires 4. A condensate film is shown in FIG. 2 which comprises a thin film region 5 in film flow over a major portion of the condensing surface 2, with thickened fillets of condensate 6 in rivulet flow adjacent fins 3 and wires 4.

For proper operation, the radial distance that fins 3 and wires 4 project from condensing surface 2 must be appreciably greater than the thickness of a condensate film formed on surface 2 in the absence of projections so that the condensate will be drawn by capillary or surface tension forces into fillets 6. Once drawn into fillets 6, the condensate can travel down the tube in rivulet flow to collection points without substantially impeding heat transfer from condensing surface 2. Rivulet flow in fillets 6 has a flow velocity about one order of magnitude greater than the flow velocity in film flow region 5. This greater velocity enables condensate drawn into fillets 6 to quickly flow down the condenser tube to a removal point without flooding the surface of the tube and causing a corresponding decrease in the film condensation heat transfer coefficient. The radius of curvature of the free face of the condensate in fillets 6 is much less than the radius of curvature in film region 5 so that a strong pressure gradient, due to the decreased surface pressure within the fillet, draws condensate from film region 3 toward the fillets. Under the influence of gravity, the condensate which enters fillets 6 passes downward in rivulet flow along the projection to a collection point.

The effective projection distance of fins 3 is the radial distance from surface 2 to the outermost edge of the fin, and the effective projection distance of wires 4 is the radial distance from surface 2 to the center line of the wires. Where a wire 4 is in contact with surface 2 its effective projection distance is equal to its radius and when it is spaced apart from surface 2, as illustrated by wire 4', its effective projection distance is equal to the sum of its radius and the spacing. It is desirable to space wires apart from surface 2 in some instances in order to increase their effective projection distance without increasing their diameters. Any increase in wire diameter causes an increase in the fraction of tube surface covered and a corresponding decrease in the fraction of tube surface available for condensation. The fraction of condenser tube surface covered by the wires is equal to $Nd/\pi D$, where N represents the number of wires, $d$ represents the wire diameter, and D is the outside diameter of the condenser tube. Where the deleterious effect of decreasing the fraction of tube surface available for condensation becomes equal to or greater than the improved heat transfer effect due to more condensate being drawn to the wire, further increases in wire diameter become undesirable. Similar reasoning dictates limits on the number of fins or wires used in any given tube as will be illustrated in a later reference to FIGS. 3 and 4.

Since the fins can be made to have virtually any effective projection distance without an increase in their thickness and therefore without an increase in the fraction of tube surface covered, their width or distance of projection is determined only by the size of the condensate fillet adjacent each fin and the distance the fillet can reach up the side of the fin. Further increases in the projection distance of the fins, although not deleterious to the heat transfer, are of little benefit.

Figure 3:
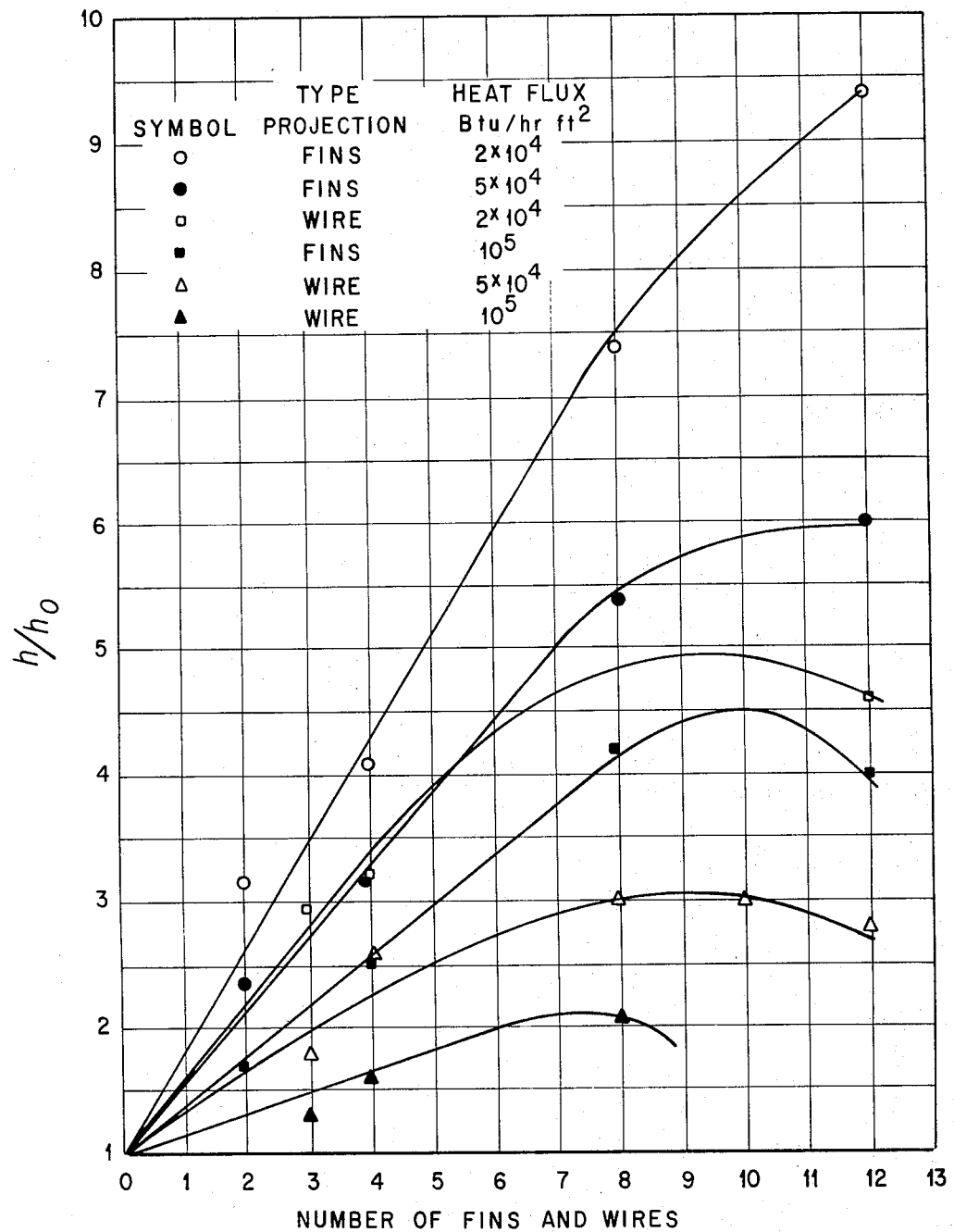
FIG. 3 is a graph illustrating the effect of varying the number of radial projections from a condenser tube on the film condensation heat transfer coefficient where the projections have rectangular and circular lateral cross sections.
Figure 4:
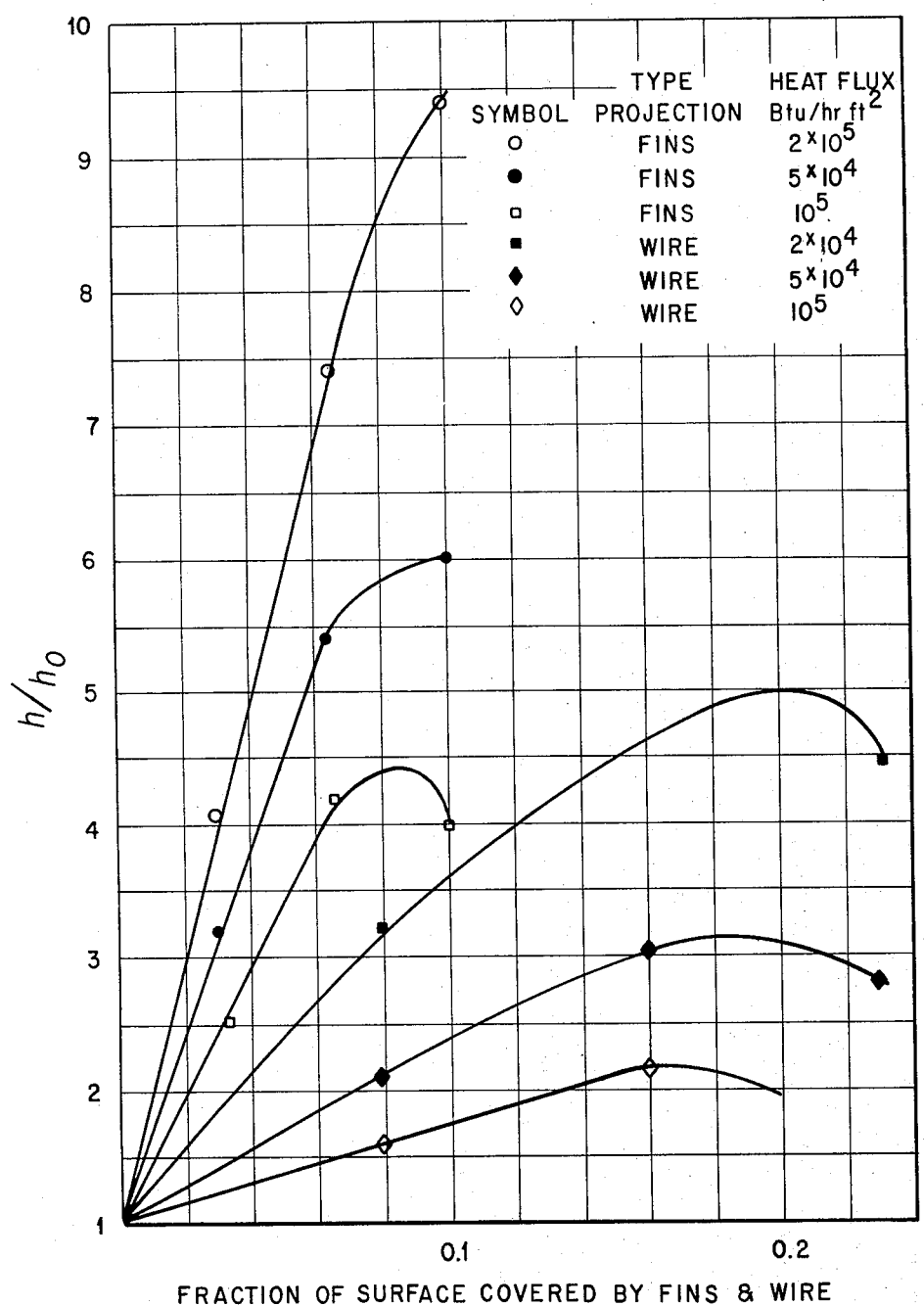
FIG. 4 is a graph showing the variation in the film condensation heat transfer coefficient with variations in the fraction of condenser tube surface covered by the radial projections as shown in FIGS. 1 and 2.
Figure 5:
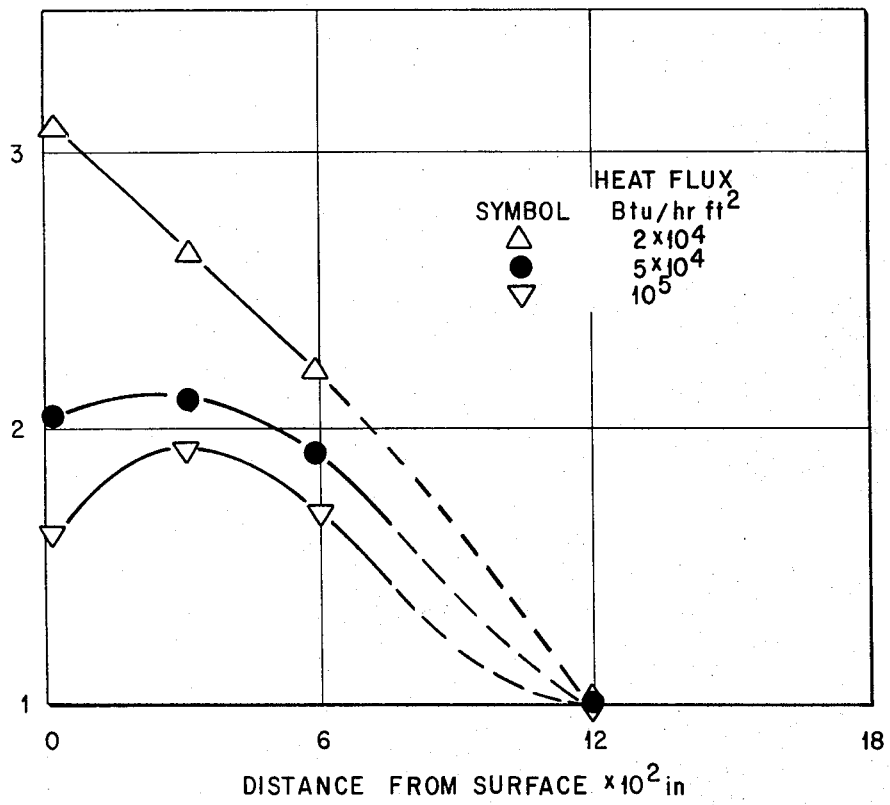
FIG. 5 is a graph showing the effect on the film condensation heat transfer coefficient of spacing the radial projections having circular cross sections at various distances away from the condenser surface.

FIGS. 3 through 5 graphically illustrate results of tests made with varying numbers of fins and wires, heat fluxes, wire diameters, and spacings between the wires and a tube condensing surface. The improvement provided through the use of fins and wires extended longitudinally along a vertical condenser tube surface was measured in terms of the overall heat transfer coefficient and is expressed in the figures as the ratio $(h/h_o)$ of the heat transfer coefficient with fins or wires to the heat transfer coefficient without fins or wires.

The test section used in generating the data of FIGS. 3 through 5 consisted of a vertically oriented, ½ inch outside diameter aluminum condenser tube surrounded by a concentric glass pipe for providing a steam flow channel. The upper end of the glass pipe was connected to a steam chest maintained at a pressure of from 4 to 5 p.s.i.g. The overall heat transfer coefficient was measured for four different ranges of mean temperature difference between the condensing steam and water coolant passing through the condenser tube. The range of temperature differentials tested provided data for heat fluxes ranging from $2 \times 10^4$ to $10^5$ B.t.u./(hr.)(ft.$^2$).

The effect of using different numbers of fins and wires equally spaced about the condenser tube described earlier is illustrated in FIGS. 3 and 4. The fins used in gathering the data of those figures were 0.013 in. thick and projected 0.125 in. from the condenser tube surface, and the wires were of 0.030 in. diameter. Both the fins and wires were held in contact with the condenser tube surface during these tests. FIGS. 3 and 4 indicate the general superiority of the fins in increasing the heat transfer coefficient. The reason may be best understood by reference to FIG. 4 where the fraction of condenser tube surface covered by the fins remains very small (about 0.1) even where the number of fins is greatest. For the same number of wires (12) the fraction of surface coverage is over twice as great (0.23) as with the fins and the corresponding reduction of condensing surface with resulting loss in heat transfer is greater.

The data of FIGS. 3 and 4 indicate that the relative enhancement of the condensing heat transfer coefficient provided by radial projections decreases with increasing heat flux. The large enhancements associated with heat fluxes in the order of $2.4 \times 10^4$ B.t.u./(hr.)(ft.$^2$) is of great interest as heat fluxes in that order are presently being considered for condenser tubes in flash evaporators.

The value of $h/h_o$ for wires increases in each case until the fraction of condenser tube surface covered by the wires reaches a value of about 0.18. Four larger 0.062 in. diameter wires were also tested and provided data in substantial agreement with the data from eight 0.030 in. diameter wires; both combinations of wires having almost the same fractional surface coverage.

The effect of displacing four 0.030 in. diameter wires at various distances from the condenser tube surface is shown in FIG. 5. At the largest heat flux tested [$10^6$ B.t.u./(hr.)(ft.$^2$)], positioning the wires with a gap of 0.030 in. between them and the tube surface causes $h/h_o$ to increase from 1.56 to 1.93. Further increases in the gap beyond 0.030 in. resulted in a decrease in $h/h_o$ from the 1.93 value until at a gap size equal to 0.120 there was no improvement in the film condensation heat transfer coefficient caused by the wires. At the lowest heat flux [$2 \times 10^4$ B.t.u./(hr.)(ft.$^2$)], displacement of the wires from the condensing surface was deleterious for all values of displacement tested.

All of the test results plotted in FIGS. 3, 4 and 5 were obtained with fins and wires secured to the outside surface of a tube similar to that illustrated in FIGS. 1 and 2. Other tests were run with steam condensing on the inside surface of a tube using small diameter wires attached to the inside tube surface. The results of tests with internal condensation were in good agreement with the curve shown in FIG. 4 where the heat flux was $5 \times 10^4$ B.t.u./(hr.)(ft.$^2$).

Although the fins and wires used in the above tests were not integrally fixed to the condenser tube so that little direct heat transfer took place between the fin or wire and the tube, an integral connection would further improve the film condensation heat transfer by causing the fins and tubes to operate as condensing surfaces as well as serving in their present capacity as means for drawing condensate from the tube condensing surface and channeling it into rivulet streams.

The above description of one form of the invention was offered for illustrative purposes only, and should not be interpreted in a limiting sense. For example, condenser shapes other than tubes could use projections to increase film condensation heat transfer and projections other than the rectangular cross section fins or circular cross section wires described herein could be used. It is intended, rather, that the invention be limited only by the claims appended hereto.

What is claimed is:

1. In a heat exchange member having a vertically oriented condensing surface, means for causing said surface to exhibit a large film condensation heat transfer coefficient comprising at least one elongated, vertically oriented projection extending longitudinally along said condensing surface, said projection causing condensate formed on said condensing surface to be drawn through the action of surface tension forces to flow channels formed by the intersection of said projections and said condensing surface.

2. The improvement of claim 1 wherein said projection has a rectangular cross section in planes normal to its longitudinal axis.

3. The improvement of claim 2 wherein said projection is integrally fixed to said condensing surface.

4. The improvement of claim 1 wherein said projection has a circular cross section in planes normal to its longitudinal axis.

5. The improvement of claim 4 wherein said projection is spaced apart from said condensing surface.

6. In a heat exchange member comprising a condenser tube having an internal coolant channel and an external condensing surface, wherein the longitudinal axis of said condenser tube is vertically oriented during a condensing operation; the improved means for causing said condenser tube to exhibit a large film condensation heat transfer coefficient comprising at least one elongated radial projection affixed integrally along the length of said condenser tube to its condensing surface and having a longitudinal axis parallel to the longitudinal axis of said tube, said radial projection having a rectangular cross section in planes normal to its longitudinal axis; said radial projection causing condensate formed on said condensing surface to be drawn through the action of surface tension forces to flow channels formed by the intersection of said radial projection and said condensing surface.

References Cited

UNITED STATES PATENTS

| Re. 19,782 | 12/1935 | Murray | 165—183 |
| 556,630 | 3/1896 | Hoberecht | 138—38 |

FOREIGN PATENTS

| 1,023,473 | 1/1958 | Germany. |
| 3,664 | 1894 | Great Britian. |

ROBERT A. O'LEARY, *Primary Examiner.*

A. W. DAVIS, JR., *Assistant Examiner.*